United States Patent [19]
Fujieda et al.

[11] Patent Number: 5,744,169
[45] Date of Patent: Apr. 28, 1998

[54] TIRE PRESS

[75] Inventors: Yasuhiko Fujieda, Hudson, Ohio; Hiroyuki Takebayashi; Masaki Naoi, both of Takasago, Japan

[73] Assignees: Kabushiki Kaisha Kobe Seiko Sho, Kobe, Japan; Kobelco Stewart Bolling, Inc., Hudson, Ohio

[21] Appl. No.: 694,026

[22] Filed: Aug. 8, 1996

[51] Int. Cl.$^6$ ............................................. B29C 35/02
[52] U.S. Cl. ........................... 425/47; 425/28.1; 425/34.1
[58] Field of Search .......................... 425/28.1, 34.1, 425/47, 48, 58

[56] References Cited

U.S. PATENT DOCUMENTS 2,904,831   9/1959   Frohlich ................................. 425/47

FOREIGN PATENT DOCUMENTS

| 1213601 | 3/1966 | Germany | 425/34.1 |
|---|---|---|---|
| 3-236912 | 10/1991 | Japan . | |
| 7-108533 | 4/1995 | Japan . | |
| 7-124951 | 5/1995 | Japan . | |

*Primary Examiner*—James P. Mackey
*Attorney, Agent, or Firm*—Oblon, Spivak, McClelland, Maier & Neustadt, P.C.

[57] ABSTRACT

A tire press in which a pair of upper and lower molds are opened/closed and squeezed by an operation of a crank mechanism is disclosed. Especially, the tire press is improved in the aspects of its machine accuracy, strength, size, and maintenance. The tire press has: a pair of upper and lower molds; a base for supporting the lower mold; side frames on both sides of the base; a side slot vertically extended in each of the side frames; a top slide which slides along the side slots and holds the upper mold; and a crank mechanism for moving the top slide only in the vertical direction. The crank mechanism includes: a crank gear; a lever attached to the crank gear and whose front and is positioned on the outer side of the outer diameter of the crank gear; and a link connecting a crank fulcrum at the tip of the lever and the top slide sliding along the side slots. The side slot vertically extends parallel to a vertical central line crossing the center of rotation of the crank gear and the crank fulcrum. Projected in the central portion through the pair of upper and lower molds are adjusted to an optional height.

5 Claims, 4 Drawing Sheets

TIRE PRESS

BACKGROUND OF THE INVENTION

1. Field of the Invention

The present invention relates to improvements in a tire press in which a pair of upper and lower molds are opened/closed and squeezed by operating a crank mechanism and, more particularly, to improvements in the aspects of its machine accuracy, strength, size, and maintenance.

There is a conventional technique of a tire press of this kind (JP-A-7-108533) made by the inventors of the present invention. As shown in FIG. 4, the conventional technique relates to a tire press comprising: a base 1 supporting a lower mold 4; side frames 2 on both sides of the base 1; a side slot 22 formed in each of the side frames 2; a top slide 3 which slides along the side slots 22 and holds an upper mold 5; and a crank mechanism 8 for vertically moving the top slide 3. In the crank mechanism 8, a circularly moving crank fulcrum 16 is formed on an end of a lever 15 which is fixed to a crank gear 11. The crank fulcrum 16 and a force application point 17 of the top slide 3 are linked by a link 18. Even if the crank gear 11 is small, a crank motion stroke is amplified by increasing the length of the lever 15, and hence the vertical movement of the tire press is increase.

FIG. 5 shows JP-B-7-124951, which is another conventional technique of a tire press comprising: a base 1 for supporting a lower mold 4; a stand frame 2 fixed to the base 1; a guide 22 formed in the stand frame 2; a top slide 3 which moves along the guide 22 and holds an upper mold 5; and a crank mechanism 6 for vertically moving the top slide 3. In the tire press, a lever 16 having a fulcrum 15 in ether the stand frame 2 or the base 1 is provided. The lever 16 moves in the vertical direction. The crank mechanism is constructed as follows. A tip fulcrum 17 of the lever 16 and a force application point 19 of the top slide 3 are linked by a first link 20. A middle fulcrum 18 of the lever 16 and a circularly moving crank fulcrum 24 of the crank mechanism are linked by a second link 21. The second link 21 and the first link 20 are connected via the lever 16, so that the circular crank motion is amplified by an amount corresponding to the work of the lever 16.

The conventional tire presses have been required to develop so as to realize (1) improvements in machine accuracy, especially concentricity when molds are opened/closed, in order to manufacture a tire product at a higher quality, (2) further miniaturization of the machine, especially the crank mechanism, (3) an improvement in productivity by a further advancement of maintenance performance, and (4) further reduction in manufacturing cost as a result of the improvements (1) to (3). The inventors of the present invention have keenly worked to answer the request and obtained good results, which are disclosed hereinbelow.

SUMMARY OF THE INVENTION

A first aspect of the invention relates to a tire press in which a pair of upper and lower molds are opened/closed and squeezed by an operation of a crank mechanism. It is an object to provide a tire press in which machine accuracy, especially concentricity when the molds are opened/closed can be improved and high-quality tire products can be efficiently yielded. According to a second aspect of the invention, an object is to provide a tire press which is further miniaturized and in which the machine accuracy is improved in the following manner. The machine height is suppressed by minimizing a distance of a vertical motion of the tire press which is necessary for works such as loading and vulcanizing of a green tire, and unloading of the vulcanized tire from the mold. A crank gear is enlarged as long as the balance of the machine can be maintained. Further another object is to provide a tire press in which productivity can be improved by improving maintenance performance.

According to the first aspect of the invention, there is provided a tire press in which a pair of upper and lower molds are opened/closed and squeezed by an operation of a crank mechanism. The tire press comprises: a base for supporting a lower mold; side frames on both sides of the base; a side slot vertically extends in each of the side frame; a top slide which slides along the side slots and holds an upper mold; and a crank mechanism for moving the top slide only in the vertical direction. The crank mechanism includes: a crank gear; a lever attached to the crank gear and whose one tip is positioned on the outer side of the outer diameter of the crank gear; and a link connecting a crank fulcrum on the tip of the lever and the top slide which slides along the side slots. The side slots extend parallel to a vertical central line which crosses the center of rotation of the crank mechanism and the crank fulcrum. With such a structure, a slide guide which supports the top slide easily receives a force acting on the link because of the vertical slots when the crank mechanism is operated. Consequently, the slide guide can slide without a shade while closely contacting slot forming faces. Furthermore, the structure is very simple, the machine can be miniaturized and the maintenance is easy. The tire press with an extremely compact structure can be consequently obtained. The machine accuracy, especially the concentricity when the molds are opened/closed is further improved. Such a press can efficiently yield a high-quality tire product.

In the second aspect of the invention, a mechanism which adjusts the height of upper rings of a center mechanism is provided. The upper rings are provided at the center position through a pair of molds. By adjusting the upper rings of the center mechanism to an optional height, the vertical space which is necessary for works such as the loading of a green tire to the molds, vulcanization, and the unloading of the vulcanized tire from the molds, is minimized. The conventional tire press has a center mechanism in which the upper rings are used in a permanent projected state. According to the invention, the vertical motion distance which is necessary for the works in the conventional tire press can be suppressed. The crank gear can be enlarged as long as the balance of the tire press is not lost and a stroke of the crank motion can be increased. Consequently, further miniaturization, strength, and machine accuracy (especially, concentricity) can be improved.

In another aspect of the invention, a drive unit for operating the crank mechanism is provided on the same side of the side slots. Thus, the maintenance performance is improved and the productivity is raised.

Preferably, a speed reducer of the drive unit which operates the crank mechanism is detachably provided via couplings. Also here, the result of the improved maintenance performance which contributes to a raise in productivity can be obtained.

DETAILED DESCRIPTION OF THE PREFERRED EMBODIMENTS

Figure 1:
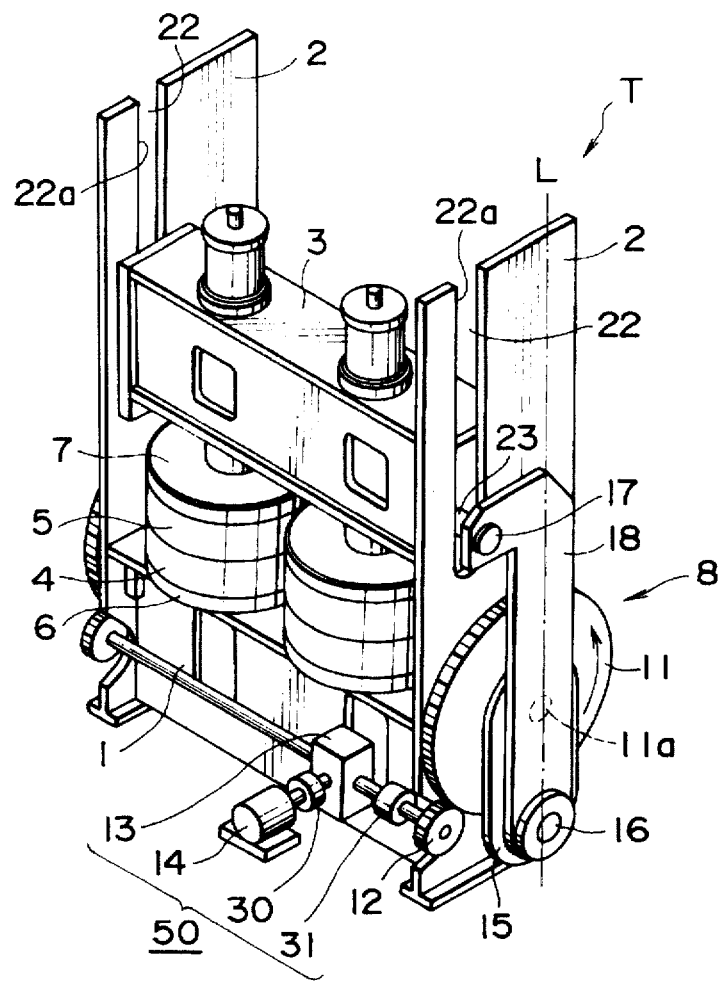
FIG. 1 is a schematic perspective view showing an embodiment of a tire press of the present invention.
Figure 2:
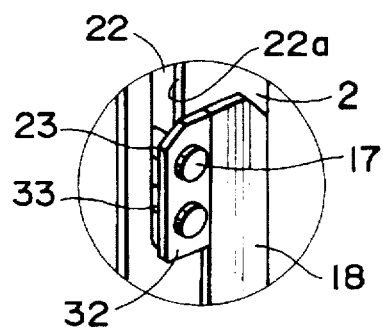
FIG. 2 is a schematic perspective view of a main portion showing a modified embodiment of a slide guide.
Figure 3:
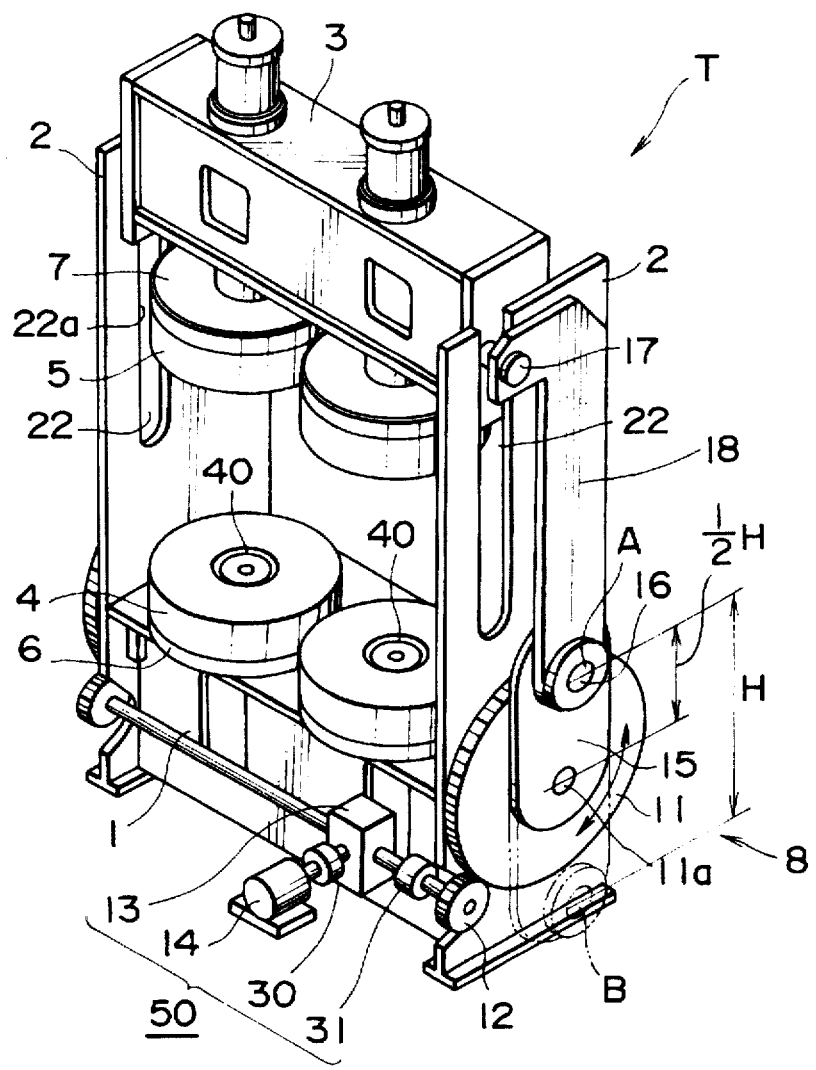
FIG. 3 is a schematic view showing an embodiment of the tire press of the invention.
Figure 4:
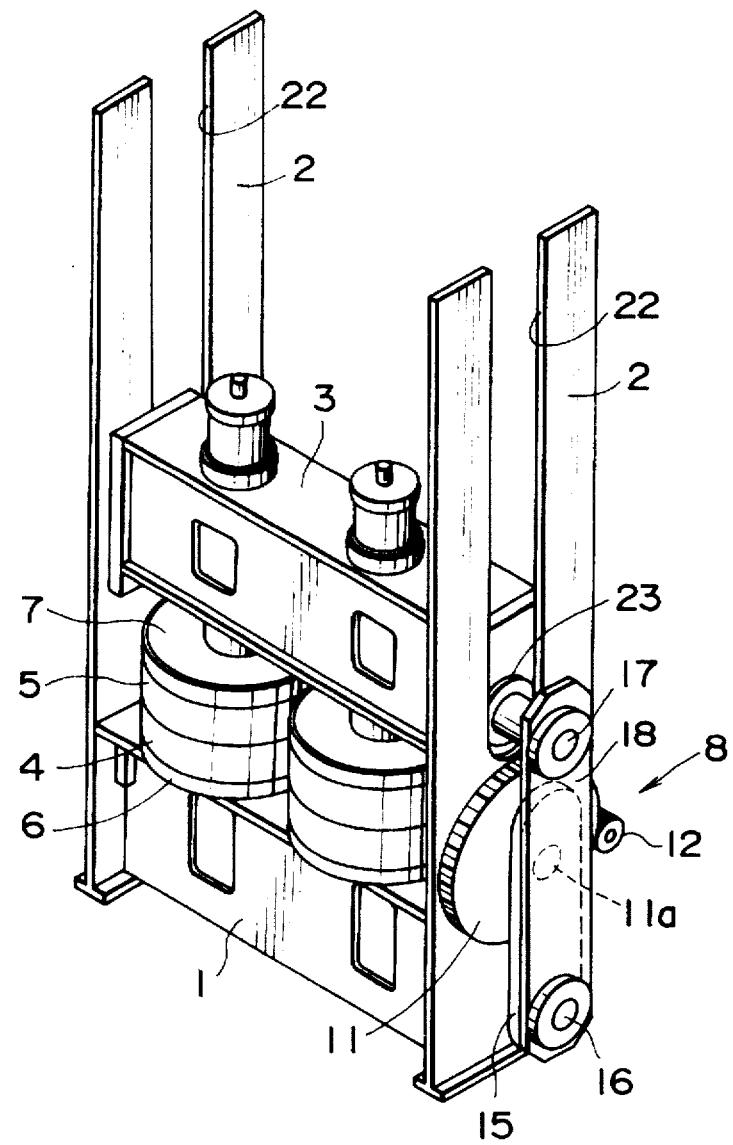
FIG. 4 is a schematic view showing a conventional tire press.
Figure 5:
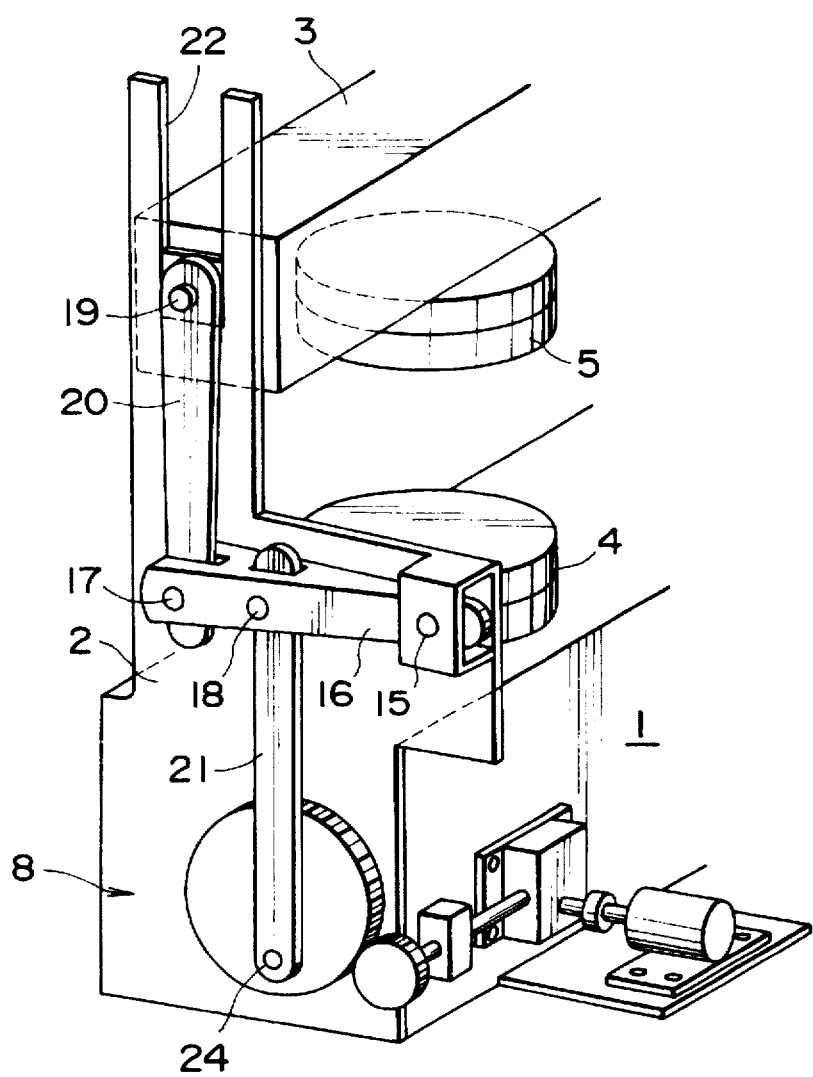
FIG. 5 is a schematic view showing another conventional tire press.

Embodiments of the invention will be described hereinbelow with reference to the drawings. FIGS. 1 to 3 are schematic perspective views showing a tire press according to the invention. The same component elements as those of the conventional tire press shown in FIG. 4 are designated by the same reference numerals.

In FIG. 1, a tire press T comprises: a base 1 supporting a lower mold 4; side frames 2 on both sides of the base 1; a side slot 22 formed in the vertical direction in each of the side frames 2; a top slide 3 which slides along the side slots 22 and holds an upper mold 5; and a crank mechanism 8 for moving the top slide 3 only in the vertical direction. In the crank mechanism 8, a crank gear 11 is rotatably supported by the base 1 and the side frame 2, and is engaged with a pinion gear 12. The pinion gear 12 is connected via a speed reducer 13 to a driving motor 14. When the motor 14 is driven, the crank mechanism 8 is operated. Reference numerals 30 and 31 denote couplings.

A lever 15 is fixed to an axis 11a of the crank gear 11. A link 18 is connected between a tip connecting pin 16 (crank fulcrum) of the lever 15 and a connecting pin 17 (force application point) of the top slide 3. In each of the side frames 2, the vertical side slot 22 extends parallel to a vertical center line L which crosses the center of rotation of the crank gear 11 and the crank fulcrum. A slide guide 23 is also slidably provided. The slide guide 23 and the link 18 are engaged in the following manner. As shown in FIG. 2 (enlarged perspective view of a main portion), a bracket 32 is attached to the upper end side of the link 18, the slide guide 23 is provided in the upper portion of the bracket 32, and an auxiliary slide guide 33 is provided in the lower portion of the bracket 32. In this way, a preferable structure which allows the top slide 3 to move more smoothly in the vertical direction is obtained. As for a center mechanism provided in the center portion of the pair of molds 4 and 5, an adjusting mechanism is provided in the base 1 so that upper rings (not shown in FIG. 1 but corresponds to reference number 40 in FIG. 3) can be adjusted to an optional height. Various systems which have been proposed, for example JP-A-3-236912, can be used as the mechanism which adjusts the height of the center mechanism.

The operation of the tire press constructed as mentioned above will now be described. In FIG. 3, the lever 15 is circularly moved by the rotation of the crank gear 11. The tip connecting pin 16 (crank fulcrum) of the lever 15 reciprocates between a point (A) just before the upper dead point of a crank stroke and a point (B) just before the lower dead point. The pin 16 makes a circular motion in the directions of the arrows. When the lever 15 is positioned at the upper dead point A, the connecting pin 17 as a force application point of the link 18 is positioned at the upper limit and the molds are opened. When the lever 15 is positioned at the lower dead point B, the connecting pin 17 is positioned at the lower limit and the molds are closed. A stroke of the crank mechanism 8 is shown by reference character H and the stroke H is determined by the distance between the center of the crank gear 11 and the tip connecting pin 16 of the lever 15. It is obviously understood that it is necessary to increase the stroke H in order to assure the distance of the vertical motion of the top slide 3. The distance is necessary for a series of operations such as loading of a green tire into the molds, vulcanization, and unloading of the vulcanized tire.

When the crank gear 11 is simply enlarged to assure the necessary vertical motion distance, the crank gear 11 becomes abnormally large. Not only the mechanical balance of the tire press deteriorates but also an uneconomical tire press is resulted. Consequently, the following characteristic structure is used in the embodiment. FIG. 3 shows a state before a green tire is loaded into the molds 4 and 5. In this state, the top face of the upper ring 40 in the center mechanism is adjusted to be housed in the base 1, so that it is lower than the top face of the lower mold 4.

Compared with a conventional case where the green tire has to be loaded into the lower mold 4 in a state where the upper rings in the center mechanism are permanently projected, the vertical movement distance of the upper mold 5—that is, the distance of the vertical motion of the top slide 3 which is necessary to assure the space required for the series of the operations of loading the green tire, vulcanization, and unloading of the vulcanized tire—can be shortened. Therefore, compared with the conventional tire press, the crank gear 11 can be relatively enlarged as long as the mechanical balance of the tire press is not lost. An improved strong and compact tire press with relatively high machine accuracy (especially, concentricity) is consequently provided.

FIG. 1 shows a state of the tire press after the green tire was loaded into the molds and the vulcanizing operation was finished. Subsequently, the crank gear 11 is rotated as shown by the arrow to lift the top slide 3 to separate the upper mold 5 from the lower mold 4. The slide guide 23 is disposed in the vertical side slots 22 parallel to the vertical central line L which crosses the center of crank rotation and the crank fulcrum as mentioned above. Therefore, the slide guide 23 receives a force which acts on the link 18 when the crank gear 11 is rotated while sliding in a state where it is closely contacted to slot-forming faces 22a of the side slot 22.

In the embodiment, as shown in FIG. 3, the motor 14 which operates the crank mechanism 8 is provided on the same side of the side slot 22 where the crank axis center assumes a reference. In addition to the slide guide 23, the side slots 22 and a drive unit 50 which has the motor 14 and reduction gear 13 as main component elements are arranged on one side (in this case, the front side) of the tire press T. Thus, the maintenance is facilitated and the productivity can be accordingly improved. Since the speed reducer 13 is detachably attached to the drive unit 50 via the front/rear couplings 30 and 31, the maintenance is further facilitated and the productivity can be further improved.

According to the first aspect of the invention as mentioned above, we proved the tire press comprising: the base for supporting the lower molds; the side frames on both sides of the base; the side slot formed in the vertical direction in each of the side frames; the top slide which slides along the side slots and holds the upper mold; and the crank mechanism for vertically moving the top slide. In the tire press, the pair of upper and lower molds are opened/closed and squeezed by the operation of the crank mechanism and the vertical side slots are formed parallel to the vertical center line which crosses the center of rotation of the crank mechanism and the crank fulcrum. Since the vertical side slots can easily receive force which acts on the link when the crank mechanism is operated, the slide guide supporting the top slide can slide while closely contacting to the slot-forming faces of the side slots. As a result, the top slide can be stably moved in the vertical direction, so that the tire press in which the machine accuracy (especially, concentricity) when the molds are opened/closed is further improved can be obtained. Such a tire press can efficiently yield a high-quality tire product.

In the second aspect of the invention, the tire press includes the height adjusting mechanism of the upper rings in the center mechanism. The upper rings are provided through the center of the pair of the molds. That is, by adjusting the upper rings in the center mechanism to an optional height, the vertical space which is necessary for the series of the operations such as loading the green tire into the molds, vulcanization, and unloading the vulcanized tire, is minimized. Therefore, the distance of the vertical motion required for the works in the tire press which has the center mechanism in which the upper rings are projected, is shortened. As a result, the crank gear is enlarged as long as the mechanical balance of the tire press is not lost and the stroke of the crank motion is increased. Finally, the tire press which is more compact and strong, with improved machine accuracy (especially concentricity) is provided.

Preferably, the drive unit which operates the crank mechanism is provided on the same side of the side slots. Thus, the tire press with improved maintenance performance and with high productivity is provided.

Preferably, the speed reducer of the drive unit which operates the crank mechanism is detachably provided via the couplings. Thus, the tire press in which the maintenance performance is improved and the productivity is raised is provided.

What is claimed is:

1. A tire press in which a mold comprising an upper mold and a lower mold is opened/closed and clamped by an operation of a crank mechanism, comprising:

a base for supporting the lower mold;

side frames disposed on opposite side of the base and provided with side slots which are vertically extended;

a top slide which slides along the side slots and holds the upper mold; and a crank mechanism for moving the top slide only in vertical directions, wherein the crank mechanism includes:

a crank gear;

a lever attached to the crank gear and whose front end is positioned on the outer side of the outer diameter of the crank gear; and a link connecting a crank fulcrum at the tip of the lever and the top slide which slides along the side slots, and the side slots are vertically formed so as to be deviated from a vertical central line crossing the center of rotation of the crank gear and the crank fulcrum.

2. The tire press according to claim 1, wherein a height of an upper ring of a center mechanism which is provided so as to penetrate the center portion of each of the upper and lower molds can be adjusted.

3. The tire press according to claim 1, including a drive unit which operates the crank mechanism provided on the same side of the vertical central line as are the side slots.

4. The tire press according to claim 3, wherein a speed reducer for the drive unit is detachably provided via a coupling.

5. A tire press in which a mold comprising an upper mold and a lower mold is opened/closed and clamped by an operation of a crank mechanism, comprising:

a base for supporting the lower mold;

side frames disposed on opposite sides of the base and provided with side slots which are vertically extended;

a top slide which slides along the side slots and holds the upper mold; and a crank mechanism for moving the top slide only in vertical directions, wherein the side slots are vertically formed as to be deviated from a vertical central line crossing the center of rotation of a crank gear and a crank fulcrum, and the crank mechanism includes means which presses a slide guide of the top slide on the side slots in only one direction during a stroke when the top slide is moved vertically.

* * * * *